Figure 1:
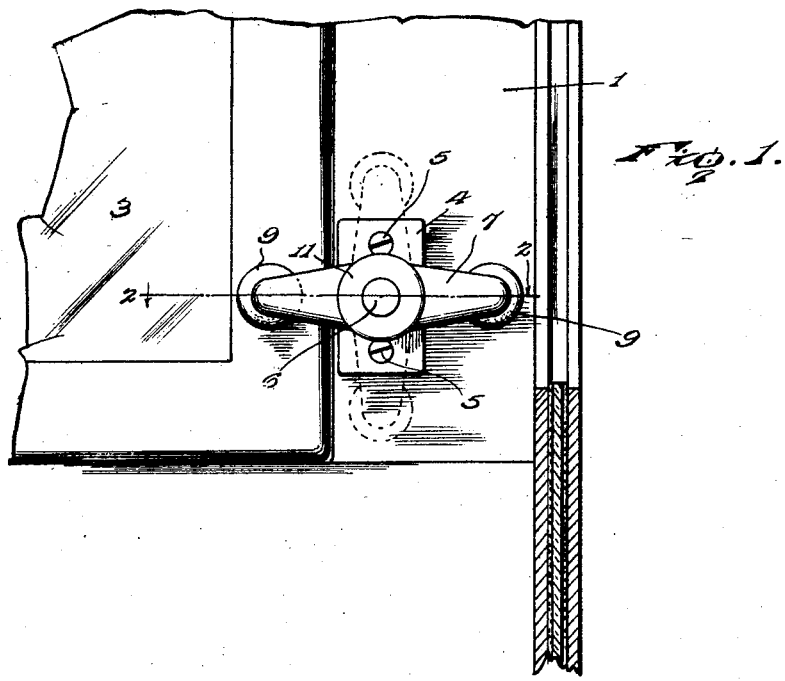

June 30, 1925.  1,544,464

S. E. LONG

ANTIRATTLING ATTACHMENT FOR WINDSHIELDS

Filed Oct. 23, 1923

Inventor

S. E. Long.

By Lacey & Lacey, Attorneys

Patented June 30, 1925.

1,544,464

UNITED STATES PATENT OFFICE.

SCOTT E. LONG, OF BELLEVILLE, ILLINOIS.

ANTIRATTLING ATTACHMENT FOR WINDSHIELDS.

Application filed October 23, 1923. Serial No. 670,308.

*To all whom it may concern:*

Be it known that I, SCOTT E. LONG, a citizen of the United States, residing at Belleville, in the county of St. Clair and State of Illinois, have invented certain new and useful Improvements in Antirattling Attachments for Windshields, of which the following is a specification.

My present invention is an attachment for windshields of automobiles whereby rattling of the windshield will be positively prevented. The invention has for its object the provision of a device for the stated purpose which will be inexpensive, easily applied and of such form as not to detract from the sightliness of a vehicle to which it may be applied. The invention also seeks to provide a device for the stated purpose which may be very easily shifted to an inoperative position and supported in such position upon the windshield support and, when so arranged, will offer no obstruction to the adjustment of the windshield. The invention is illustrated in the accompanying drawing and will be hereinafter fully set forth.

Figure 2:
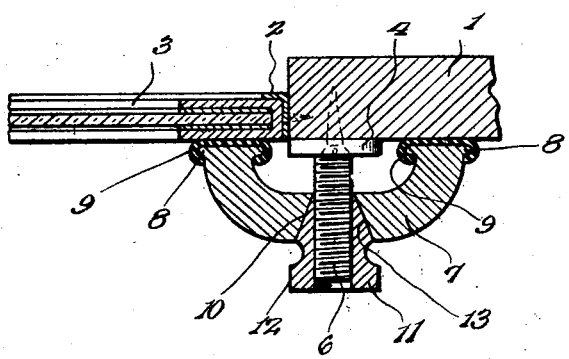

In the drawing:

Figure 1 is a sectional elevation of a portion of a windshield and its support showing my improved antirattling device applied thereto, and Fig. 2 is a detail horizontal section on the line 2—2 of Fig. 1.

In the drawing, the reference numeral 1 indicates a portion of a windshield support which may be of the usual or any preferred construction and is shown equipped with a flange 2 forming a stop to limit the forward closing movement of the windshield which is indicated at 3 and may be of any well-known form. In carrying out my invention, I employ a base plate 4 which is secured to the support 1 in any convenient manner, as by screws 5 inserted through the base plate into the support. Projecting centrally from the base plate at a right angle thereto is a threaded stud 6, and mounted loosely upon the stud is a presser bar or yoke 7 which is substantially U-shaped, as will be readily understood upon reference to Fig. 2, and is provided at its extremities with annular beads 8 whereby caps 9 of rubber or other elastic material may be fitted over the ends of the bar and held thereon so that, when the bar is secured against the windshield or its support, the said parts will be firmly held without any marring of the highly finished surfaces. The presser bar is provided centrally with an opening through which the threaded stud 6 projects, and this opening is preferably flared in a direction from the base plate 4, as indicated at 10 in Fig. 2. A sleeve nut 11 is engaged upon the threaded stud, and this sleeve nut may have its periphery knurled or otherwise treated at its outer end, as indicated at 12, whereby a firm gripping surface will be provided. The forward end of the sleeve is tapered, as shown at 13, whereby it will fit easily within the flared opening of the presser bar and when turned home will exert a binding pressure upon the bar so as to hold it in a set position.

It is thought the use of the device will be readily understood from the foregoing description, taken in connection with the accompanying drawing. By reference to the full and the dotted lines in Fig. 1, it will be noted that, when the windshield is to be held against rattling in its closed position, the presser bar is so disposed as to bridge the joint between the windshield and its support with one head or cushion 9 bearing against the surface of the support and the other head or cushion bearing against the windshield frame. If the sleeve nut be then turned home, the presser bar will be driven against the windshield frame and against the support so that the windshield frame will be held firmly against the stop flange 2 and all rattling of the windshield will be overcome and prevented. When the windshield is to be swung to an open position, the sleeve nut is loosened sufficiently to permit the presser bar to be turned to the vertical position shown in dotted lines in Fig. 1, after which the nut is again turned home and the presser bar will then be held firmly against the windshield support out of the way of the windshield or the windshield frame which may then be easily swung to the open position in the usual manner. My device is exceedingly simple and may be readily applied to any existing vehicle and, when applied, will offer no obstruction to the adjustment of the windshield and will not interfere in any way with the ingress or egress of persons using the vehicle.

Having thus described the invention, what is claimed as new is:

A device for the purpose set forth comprising a base plate adapted to be secured to a windshield support, a threaded stud projecting from the rear face of the base plate, a presser yoke having a central outwardly flared smooth bore opening through which the stud extends and having its ends constructed to engage against a windshield and the windshield support, and a sleeve nut mounted upon the threaded stud and having its forward end tapered and smooth to engage within the rearwardly flared opening in the presser yoke whereby to clamp the same against the windshield and the windshield support when turned home and constitute a pivot therefor when loosened.

In testimony whereof I affix my signature.

SCOTT E. LONG. [L. S.]